US012768964B2

(12) United States Patent
Perotto

(10) Patent No.: US 12,768,964 B2
(45) Date of Patent: Oct. 20, 2026

(54) CROSSTALK CALIBRATION FOR DIRECT TIME-OF-FLIGHT SENSOR

(71) Applicant: STMicroelectronics International N.V., Geneva (CH)

(72) Inventor: Thomas Perotto, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 655 days.

(21) Appl. No.: 18/341,487

(22) Filed: Jun. 26, 2023

(65) Prior Publication Data

US 2024/0426985 A1 Dec. 26, 2024

(51) Int. Cl.

| | |
|---|---|
| ***G01S 7/497*** | (2006.01) |
| ***G01S 7/4861*** | (2020.01) |
| ***G01S 7/4865*** | (2020.01) |
| ***G01S 17/10*** | (2020.01) |
| *G01S 7/487* | (2006.01) |
| *G01S 17/894* | (2020.01) |

(52) U.S. Cl.

CPC ............ *G01S 7/497* (2013.01); *G01S 7/4861* (2013.01); *G01S 7/4865* (2013.01); *G01S 17/10* (2013.01); *G01S 7/4876* (2013.01); *G01S 17/894* (2020.01)

(58) Field of Classification Search

USPC .......................................................... 702/97

See application file for complete search history.

(56) References Cited

U.S. PATENT DOCUMENTS

| | | | | |
|---|---|---|---|---|
| 2020/0064452 | A1* | 2/2020 | Avlas | G01S 7/4804 |
| 2020/0088875 | A1* | 3/2020 | Sato | G01S 17/10 |
| 2020/0191958 | A1* | 6/2020 | Ikuta | G01S 7/4865 |
| 2020/0271765 | A1 | 8/2020 | Glover et al. | |
| 2021/0208258 | A1* | 7/2021 | Kim | G01S 7/4816 |
| 2022/0035011 | A1 | 2/2022 | Pacala | |
| 2022/0187431 | A1 | 6/2022 | McLeod et al. | |
| 2022/0196812 | A1* | 6/2022 | Nelson | G01S 7/4876 |

FOREIGN PATENT DOCUMENTS

| | | | |
|---|---|---|---|
| EP | 3370080 | A1 | 9/2018 |

OTHER PUBLICATIONS

European Extended Search Report, Application No. 24182244.4-1206, Nov. 11, 2024, 7 pages.

* cited by examiner

*Primary Examiner* — Paul D Lee

(74) *Attorney, Agent, or Firm* — Slater Matsil, LLP

(57) ABSTRACT

A method of calibrating a direct time-of-flight (dToF) sensor to compensate for crosstalk includes emitting N photonic pulses from an emitter of the dToF sensor where N is the number of photonic pulses, receiving N crosstalk signals including a first crosstalk signal and N−1 remaining crosstalk signals at a receiver of the dToF sensor, averaging the N−1 remaining crosstalk signals to generate an averaged crosstalk signal, subtracting the first crosstalk signal from the averaged crosstalk signal to generate an estimated wraparound signal, subtracting the estimated wraparound signal from each of the N−1 remaining crosstalk signals to obtain corrected crosstalk signals, and calibrating the dToF sensor using the corrected crosstalk signals.

20 Claims, 6 Drawing Sheets

CROSSTALK CALIBRATION FOR DIRECT TIME-OF-FLIGHT SENSOR

TECHNICAL FIELD

The present invention relates generally to direct time-of-flight (dToF) sensors, and, in particular embodiments, to systems and methods for calibrating dToF sensors to compensate for crosstalk.

BACKGROUND

Time-of-flight (ToF) techniques measure the amount of time taken for a signal (e.g., an object, particle, wave, etc.) to travel from an emitter to a target and reflect back to a receiver. ToF sensors (also referred to as ToF imagers) are used in a variety of applications including range detection, object presence, recognition and motion detection, measuring properties such as composition and flow rate, and 3-dimensional imaging. Broadly speaking, there are two types of ToF sensing: direct ToF (dToF) sensing and indirect ToF (iToF) sensing. In the case of dToF sensing, a dToF system emits a signal pulse and directly measures the elapsed time between emission of the signal and the return of a reflected signal off a target object. The elapsed time (the time of flight) can then be converted into a distance measurement. In contrast, iToF methods compare the phase difference between a modulated emitted signal and a return signal to indirectly measure distance.

Objects very close to the emitter and receiver of a ToF sensor can cause crosstalk from the emitted signal to me measured by the receiver. A common example of such an object is a cover glass that may be mounted over the ToF sensor to protect the sensor. The properties of the cover glass (e.g., transparency to the emitted and reflected signals, position, thickness, consistency, etc.) can be carefully chosen to minimize negative impacts on the ToF sensor. However, some portion of the emitted signal is still reflected back toward the ToF sensor resulting in crosstalk. This crosstalk signal is accounted for using a crosstalk calibration process.

During the crosstalk calibration process, the ToF sensor (e.g., the device into which the ToF sensor is being integrated) is removed from the production line. The single ToF sensor is placed in a dark area in a fixed position relative to a target at known distance from the ToF sensor. The crosstalk calibration process is then run while the ToF sensor remains in the dark area and is relatively slow, with each crosstalk calibration lasting on the order of seconds (e.g., 2 seconds). The ToF sensor must then be pushed back onto the production line and the next ToF sensor must be removed to be calibrated.

There are many drawbacks to this crosstalk calibration process. The calibration time is long compared to other production line processes resulting in decreased throughput. Additionally, there are also special hardware and space requirements (e.g., the dark area, known target, etc.) in order to properly execute the crosstalk calibration process. Therefore, crosstalk calibration processes that do not disrupt production while still maintaining a high degree of accuracy are desirable.

SUMMARY

In accordance with an embodiment of the invention, a method of calibrating a direct time-of-flight (dToF) sensor to compensate for crosstalk includes emitting N photonic pulses from an emitter of the dToF sensor where N is the number of photonic pulses, receiving N crosstalk signals including a first crosstalk signal and N−1 remaining crosstalk signals at a receiver of the dToF sensor, averaging the N−1 remaining crosstalk signals to generate an averaged crosstalk signal, subtracting the first crosstalk signal from the averaged crosstalk signal to generate an estimated wraparound signal, subtracting the estimated wraparound signal from each of the N−1 remaining crosstalk signals to obtain corrected crosstalk signals, and calibrating the dToF sensor using the corrected crosstalk signals.

In accordance with another embodiment of the invention, a dToF sensing device includes a dToF sensor that includes an emitter configured to emit N photonic pulses, and a receiver configured to receive N crosstalk signals, a processor coupled to the dToF sensor, and a memory storing program instructions coupled to the processor. The N crosstalk signals include a first crosstalk signal and N−1 remaining crosstalk signals where N is the number of photonic pulses. The program instructions, when executed by the processor, enable the processor to average the N−1 remaining crosstalk signals to generate an averaged crosstalk signal, subtract the first crosstalk signal from the averaged crosstalk signal to generate an estimated wraparound signal, subtract the estimated wraparound signal from each of the N−1 remaining crosstalk signals to obtain corrected crosstalk signals, and calibrate the dToF sensor using the corrected crosstalk signals.

In accordance with still another embodiment of the invention, a dToF sensing device, includes a dToF sensor that includes a focal plane and a field of view disposed over the focal plane, a cover glass disposed over the focal plane, an emitter disposed at the focal plane and configured to emit N photonic pulses towards the cover glass to generate N crosstalk signals from portions of each of the N photonic pulses that are reflected by the cover glass, a receiver disposed at the focal plane and configured to receive the N crosstalk signals, and a processor coupled to the dToF sensor. The N crosstalk signals include a first crosstalk signal and N−1 remaining crosstalk signals where N is the number of photonic pulses. The processor is configured to average the N−1 remaining crosstalk signals to generate an averaged crosstalk signal, subtract the first crosstalk signal from the averaged crosstalk signal to generate an estimated wraparound signal, subtract the estimated wraparound signal from each of the N−1 remaining crosstalk signals to obtain corrected crosstalk signals, and calibrate the dToF sensor using the corrected crosstalk signals.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
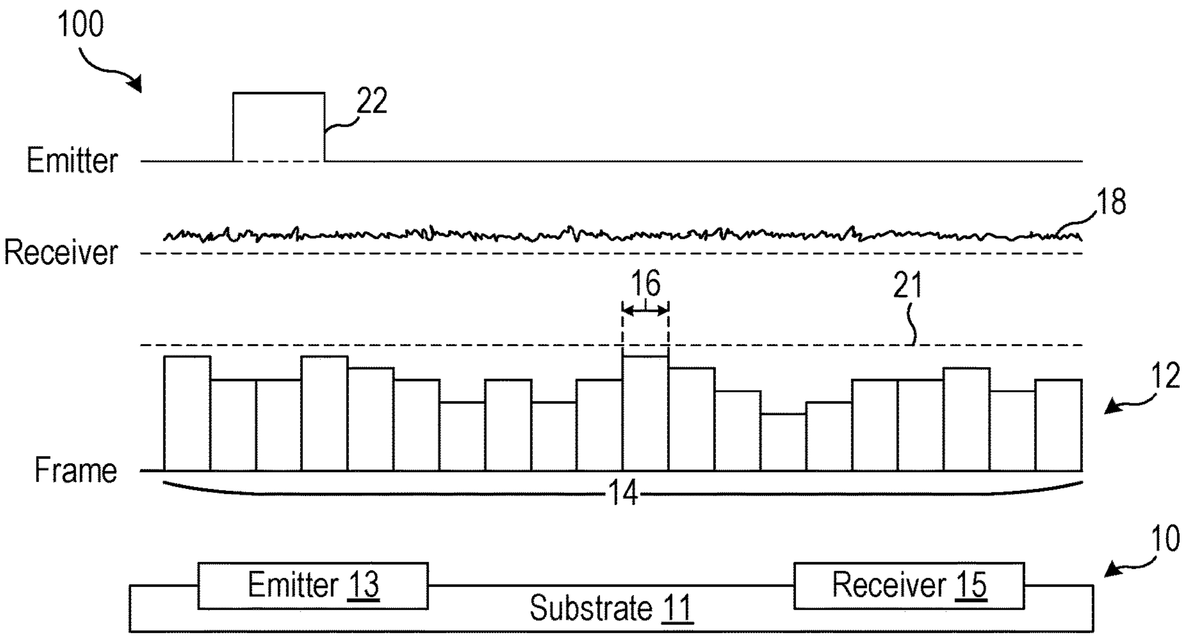
FIG. 1 illustrates example graphs associated with a direct time-of-flight (dToF) sensor with no cover and no target in the field of view (FOV) of the dToF sensor, the graphs qualitatively showing a dToF pulse, received background signal, and a corresponding histogram in accordance with embodiments of the invention.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions “around”, “approximately”, and “substantially” signify within 10%, and preferably within 5% of the given value or, such as in the case of substantially zero, less than 10% and preferably less than 5% of a comparable quantity.

When a ToF sensor is embedded into a device (e.g., a customer application), it is generally behind a transparent cover (commonly referred to as a cover glass, although it need not be glass) for aesthetic or protective reasons. Adding a cover glass over the ToF sensor introduces crosstalk to the ToF system, which may be reduced through careful design choices, but is nevertheless unavoidable. Consequently, all applications of ToF sensors that have a cover glass (or any other structure resulting in a crosstalk signal) requires a crosstalk calibration procedure.

Conventional crosstalk calibration is an in-factory calibration procedure with a specific setup, that must be performed in particular conditions. That is, conventional crosstalk calibration imposes several undesirable constraints on production, including hardware and space requirements (in order to ensure that each ToF sensor device is in a dark enough area that is free of uncontrollable target objects within the field of view (FOV) of the ToF sensor) as well as time requirements (the ToF sensor devices must be removed from the production line and the crosstalk calibration itself takes on the order of seconds). As a result, conventional crosstalk calibration is undesirable.

There are two alternatives to conventional crosstalk calibration. First, a generic crosstalk calibration may be installed in each of the ToF sensor devices and the individualized crosstalk calibration procedures can be avoided entirely. Unfortunately, the specifics of the crosstalk calibration are highly dependent on the specific environment very near the ToF sensor. For example, not only would generic crosstalk calibrations need to be created for the exact cover glass arrangement each ToF sensor application (e.g., cover glass distance, material, thickness, size, etc.), but such a generic crosstalk calibration is insufficient to correct for the specific structural variations of each ToF sensor device. In particular, each cover glass and ToF sensor is unique, and a generic crosstalk calibration cannot properly account for the variations resulting in undesirable losses in ToF sensor device performance.

The second alternative to conventional crosstalk calibration is to perform the crosstalk calibration procedure without adhering to the hardware, space, and time constraints of conventional crosstalk calibration. For instance, crosstalk calibration may be performed without removing the ToF sensor device from the production line (e.g., even while the device is moving). This has the advantage of being an individualized crosstalk calibration (and so accounts for the device-to-device variations of the cover glass and the ToF sensor), but has the significant disadvantage of being performed outside of an ideal environment. Specifically, without the dedicated crosstalk calibration area, background noise levels may vary and unknown targets may be in the FOV of the ToF sensor.

One particular problem with performing crosstalk calibration in an uncontrolled environment is that a target may generate an undetectable wraparound signal. A wraparound signal occurs when an unknown target is present within the FOV of the ToF sensor and the return signal caused by the reflection of a first emitted pulse overlaps with a second emitted pulse. In this case, the wraparound signal is received in addition to the crosstalk signal (and background noise of course). Because whether or not there is a target in the FOV of the ToF sensor is not known, there is no way to know if the crosstalk signal includes a wraparound signal or not. Thus, there is a risk of overestimating the crosstalk level and improperly calibrating the ToF sensor device. This may be particularly problematic given the critical nature of many applications of ToF sensors (e.g., automotive, medical, etc.).

In view of the above deficiencies, improved crosstalk calibration systems and methods are desirable. The example systems and methods described herein provide alternatives to conventional crosstalk calibration procedures that are both accurate and efficient. For example, the example system and methods may advantageously be performed without removing ToF sensor devices from a production line and without the risk of improper crosstalk calibration (e.g., from wraparound signals or from environmental factors). For instance, the example systems and methods described herein may result in accurate and efficient crosstalk estimation even when unknown targets are within the FOV of the ToF sensor.

In various embodiments, a method of calibrating a ToF sensor to compensate for crosstalk includes using the first crosstalk signal of N crosstalk signals as a baseline signal that has no wraparound component. The first crosstalk signal is subtracted from the average of the N−1 remaining crosstalk signals to generate an estimated wraparound signal. The estimated wraparound signal can then be subtracted from each of the N−1 remaining crosstalk signals to obtain corrected crosstalk signals. With the wraparound contribution removed, the crosstalk calibration of the ToF sensor can be performed using the corrected crosstalk signals.

The N crosstalk signals may be obtained by emitting N pulses (e.g., photon pulses) and receiving the N crosstalk signals using one or more detectors (e.g. photon detectors such as avalanche photodiodes, PIN diode, etc.). For example, each of the N crosstalk signals may be detected and stored as a histogram that includes a number of bins each storing the signal received during a specific time period within a frame (i.e. the frame represents the total time between emitted pulses and each bin is time segment within the frame). Because the first frame cannot include a wraparound contribution, the crosstalk signal of the first frame (i.e., the first crosstalk signal) can be used as a baseline to estimate the wraparound signal in the remaining frames and remove it to generate a differential histogram.

The embodiment crosstalk calibration systems and methods described here may have various additional advantages over conventional systems and methods. For example, the embodiment crosstalk calibration systems and methods may advantageously avoid specific hardware or space requirements. For example, no specific target is required in order to perform crosstalk calibration of a ToF sensor (e.g., because the embodiment crosstalk calibration methods account for all possible scenarios regarding unknown targets in the FOV). Additionally, the embodiments may have the benefit of reduced or eliminated noise requirements (e.g., no need for a dark area) during the crosstalk calibration compared to conventional techniques.

Other potential advantages of the embodiment crosstalk calibration systems and methods relate to calibration efficiency. The crosstalk calibration may advantageously be performed while the ToF sensor device is moving (e.g., on a production line). This allows the crosstalk calibration to be performed without removal from the production line increasing efficiency. Since wraparound signals are not a concern, the pulse period may also be reduced which may advantageously increase the signal-to-noise ratio while also reducing the time necessary to perform the crosstalk calibration. Because the pulse period is shorter than conventional methods and the ToF sensor devices are not taken off the production line, there may be increased flexibility with the number of samples collected during the crosstalk calibration. That is, a greater latitude for taking larger sample sizes may be available to increase accuracy of the crosstalk calibration while still being more efficient than conventional processes.

The embodiment crosstalk calibration systems and methods described herein may also have the advantage being performed at a stable pulse frequency (i.e. constant pulse period). For example, the potentially intractable complexity of multifrequency crosstalk calibration may be advantageously avoided. Another potential benefit of constant pulse frequency is consistent power consumption. Additionally, the crosstalk calibration may have the benefit being performed at pulse frequencies that match or exceed operational pulse frequencies of the ToF sensor (e.g., comporting with specification). Since the time required to acquire a statistically sufficient sample size is lower with increased pulse frequency (i.e., reduced pulse period) and the power consumption is constant, overall power consumption by the crosstalk calibration may also be advantageously reduced.

Figure 2:
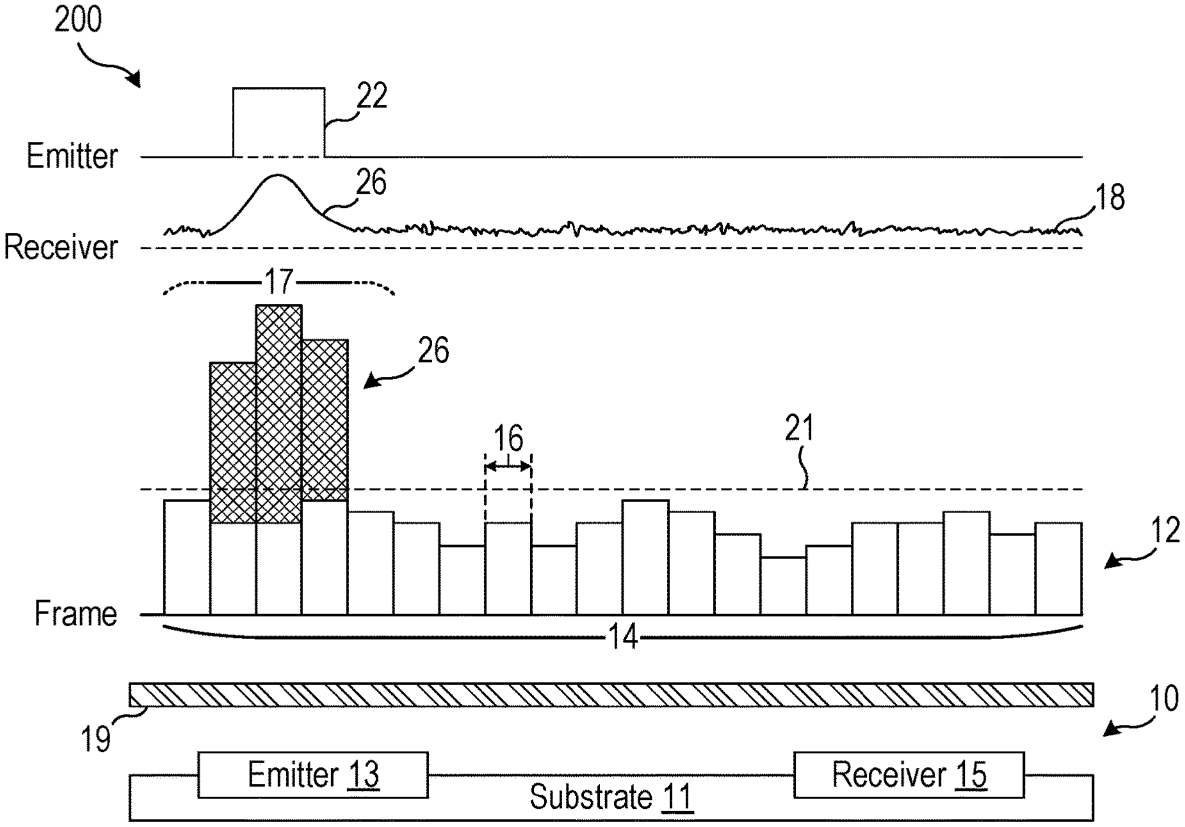
FIG. 2 illustrates example graphs associated with a dToF sensor with a cover but no target in the FOV of the dToF sensor, the graphs qualitatively showing a dToF pulse, received crosstalk signal (and background signal), and a corresponding histogram in accordance with embodiments of the invention.
Figure 3:
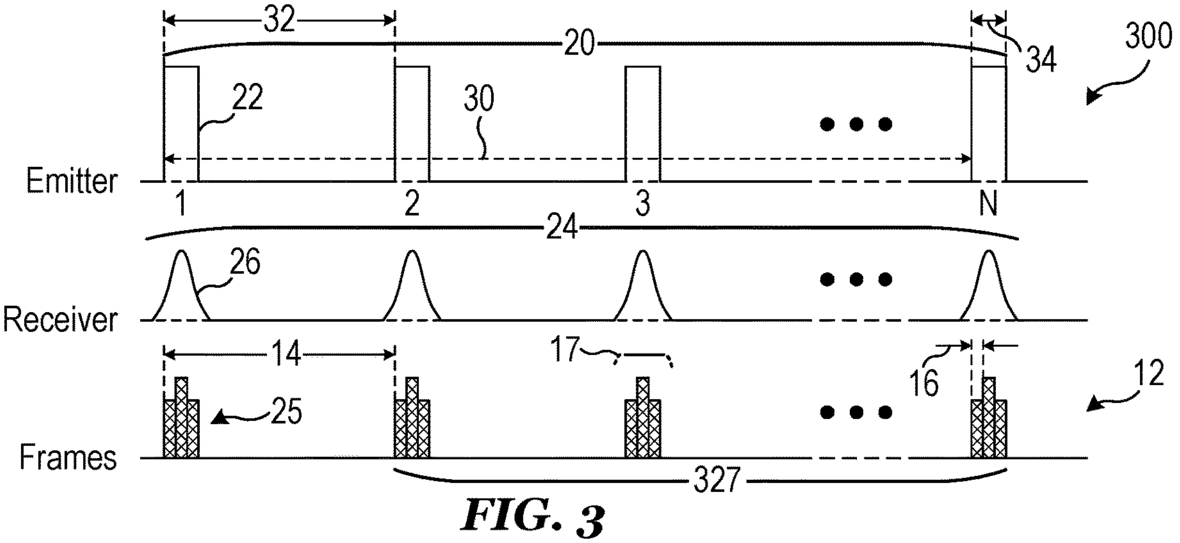
FIG. 3 illustrates example graphs associated with a dToF sensor emitting N dToF pulses and receiving N crosstalk signals in a first case where there is no target in the FOV of the dToF sensor in accordance with embodiments of the invention.
Figure 4:
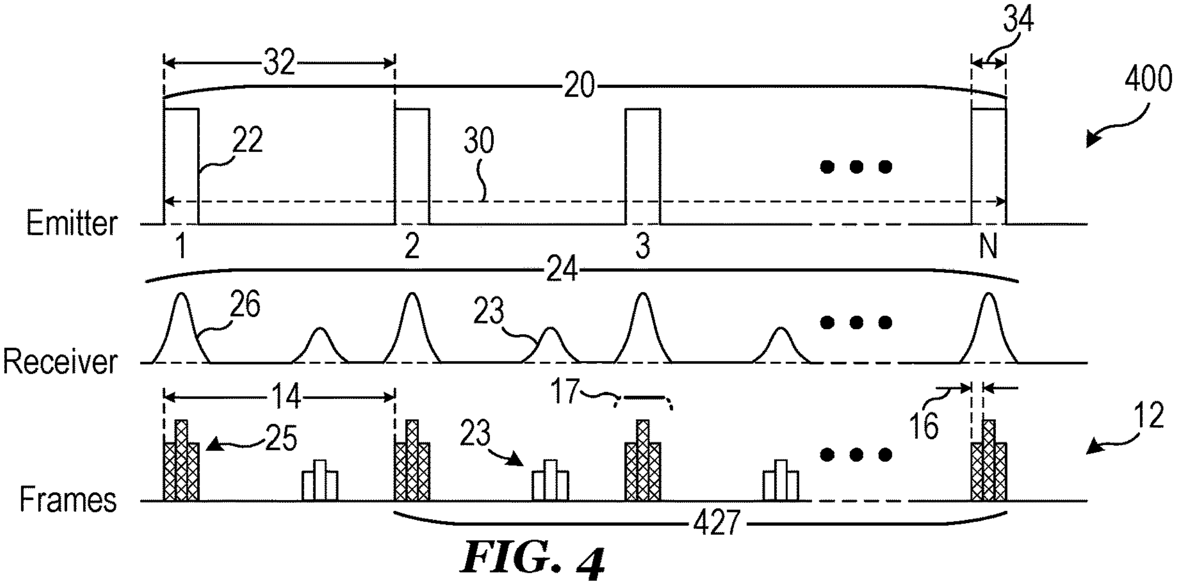
FIG. 4 illustrates example graphs associated with a dToF sensor emitting N dToF pulses and receiving N crosstalk signals in a second case where there is a target in the FOV of the dToF sensor but the target is not in wraparound range of the dToF sensor in accordance with embodiments of the invention.
Figure 5:
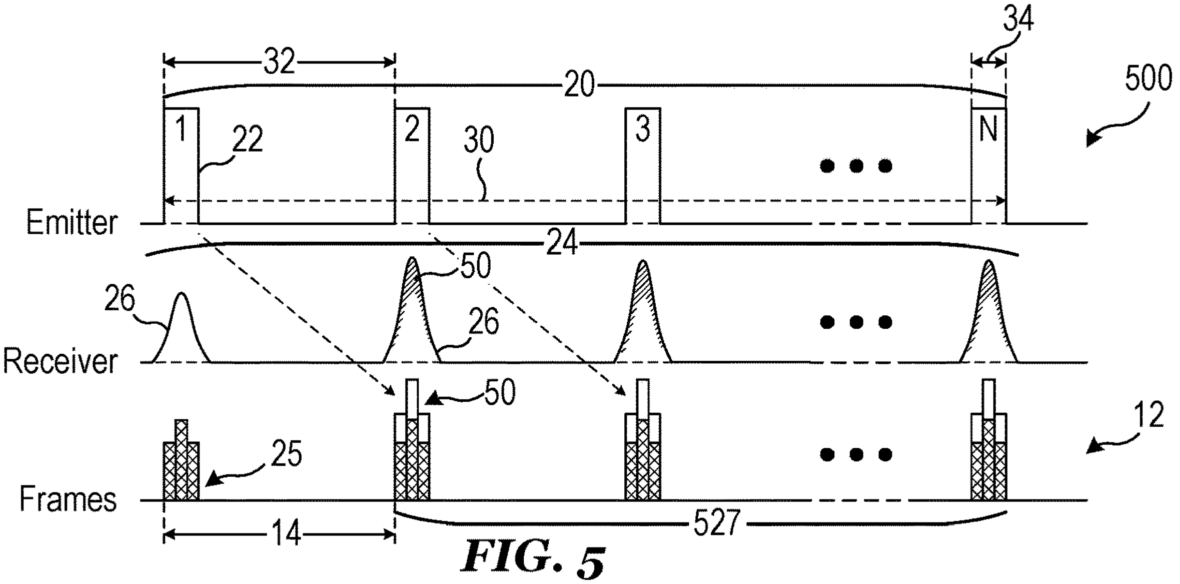
FIG. 5 illustrates example graphs associated with a dToF sensor emitting N dToF pulses and receiving N crosstalk signals in a third case where there is a target the FOV of the dToF sensor in wraparound range of the dToF sensor in accordance with embodiments of the invention.

Embodiments provided below describe various systems and methods relating to dToF sensors, and in particular, to systems and methods for calibrating dToF sensors to compensate for crosstalk. The following description describes the embodiments. FIGS. 1 and 2 are used to compare dToF sensors with and without a cover. Three example cases of dToF sensors emitting dToF pulses are described using FIGS. 3-5. Intermediate signals and corrected crosstalk signals of a crosstalk calibration process for the three cases of FIGS. 3-5 are described using FIGS. 6-8. An example dToF sensing device is described using FIG. 9. Another example dToF sensing device that is on a production line is described using FIG. 10. A method for calibrating dToF sensors to compensate for crosstalk is described using FIG. 11.

FIG. 1 illustrates example graphs associated with a direct time-of-flight (dToF) sensor with no cover and no target in the field of view (FOV) of the dToF sensor, the graphs qualitatively showing a dToF pulse, received background signal, and a corresponding histogram in accordance with embodiments of the invention.

Referring to FIG. 1, qualitative graphs 100 demonstrate the signal received by a receiver 15 of a dToF sensor 10 when a dToF pulse 22 is pulse is emitted from an emitter 13 and there is no target within the FOV of the dToF sensor 10. In particular, the dToF pulse 22 is emitted from the emitter 13 and the receiver 15 receives a background signal 18. Because there is nothing obstructing the emitter 13, the dToF pulse 22 is emitted without deflection and the receiver 15 does not detect a crosstalk signal. Moreover, because there is no target in the FOV of the dToF sensor 10, the dToF pulse 22 is also not reflected back and no target signal is received.

The dToF sensor 10 may be any type of dToF sensor. In various embodiments, the dToF sensor 10 is a photonic dToF sensor, such as a ToF camera. The dToF sensor 10 may be configured to operate in a variety of modes including imaging, range finding, object detection, tracking, and identification, and others. Although photonic dToF sensors are used as examples throughout this description, other dToF sensors are possible such as ion dToF sensors, neutron dToF sensors, etc. Any particle scattering near the receiver 15 may result in crosstalk that needs to be corrected.

The dToF pulse 22 may be an electromagnetic pulse (i.e. a photonic pulse), such as a near-infrared (NIR) pulse (e.g., so that the dToF pulse 22 is not visible to the human eye). In various embodiments, the wavelength of the dToF pulse 22 is between about 800 nm and about 1000 nm. For instance, the wavelength of the dToF pulse 22 may be chosen to be in solar notches (gaps in the otherwise fairly continuous spectrum of the sun). In one embodiment, the wavelength of the dToF pulse 22 is about 940 nm. In another embodiment, the wavelength of the dToF pulse 22 is about 850 nm. In still another embodiment, the wavelength of the dToF pulse 22 is about 905 nm. The wavelength of the dToF pulse 22 may also be longer (e.g., in the short-wave infrared (SWIR) portion of the electromagnetic spectrum, emitted by InGaAs laser diodes, Ge on Si laser diode, etc.). In various embodiments, the wavelength of the dToF pulse 22 is between about 980 nm and about 1600 nm, and the wavelength is between about 1300 nm and about 1550 nm in some embodiments.

The emitter 13 and the receiver 15 may be supported by a substrate 11, as shown, which may be any type of suitable substrate (e.g., semiconductor substrate, printed circuit board (PCB), glass substrate, etc.). In the specific example of a photonic dToF sensor, the emitter 13 may include one or more light sources, such as a light emitting diode (LED) or a laser diode. In the context of a photonic dToF sensor, the emitter 13 may be referred to as an illumination unit. In one embodiment, the emitter 13 includes a vertical-cavity surface-emitting laser (VCSEL).

The receiver 15 may be implemented as a detector (or array of detectors) that generate an electric signal upon receiving reflected dToF pulses. In various embodiments, the receiver 15 includes a particle detector, and the receiver 15 includes a photon detector in some embodiments. The receiver 15 may include an avalanche photo diode (APD) and includes a single-photon avalanche diode (SPAD) in one embodiment. The receiver 15 may also include a PIN diode, among other detector types. Detectors other than photon detectors are of course possible (for example, any type of dToF sensor may benefit from the crosstalk calibration systems and methods described herein).

The dToF sensor 10 stores the received signals in a histogram 12. For example, the receiver 15 may convert received signals into analog electrical signals within the dToF sensor 10. The receiver 15 may then use a threshold (e.g., voltage) to record counts indicating whether a signal was received during a certain time period. For this purpose, the histogram 12 is divided into frames that each contain a number of bins. For example, a frame may be the time period between each dToF pulse 22. The graphs 100 show a single frame 14 that is divided into bins 16. Each bin 16 corresponds with a time period (corresponding to object distance) in the frame 14 so that time information of received signals relative to the dToF pulse 22 can be stored and processed. The bin size (e.g., time period associated with each bin) may be constant (although there is no particular requirement that this be the case). In various embodiments, the size of the bins is on the order of nanoseconds, and the size of the bins is less than about 1 ns in some embodiments. For example, the size of the bins may be lower, such as on the order of hundreds of picoseconds or tens of picoseconds. The particular size of the bins may depend on the specific implementation how small the bins can be may depend on hardware capability.

As mentioned above, a SPAD may be used as a detector of reflected light (as part of the receiver 15). In some applications, an array of SPADs is provided as the detector (e.g., an SPAD array) in order to detect a reflected light pulse. A reflected photon may generate a carrier in the SPAD through the photo electric effect. The photon-generated carrier may trigger an avalanche current in one or more of the SPADs in an SPAD array. The avalanche current may signal an event, namely that a photon has been detected. Information related to the reflected intensity, also referred to as "signal count," is output as histograms of the SPAD array (e.g., the histogram 12 including a plurality of bins 16.

As shown, the dToF sensor 10 may be configured to recognize or calculate a background noise level 21 beneath which the binned signals of the histogram 12 are considered to be background noise (e.g., not indicating the presence of a target object in the FOV of the dToF pulse 22). Here, all of the binned signals are below the background noise level 21 because the receiver 15 has not received a target signal and there is no crosstalk contribution. Of course, the exact position of the background noise level 21 may vary and (although not shown) the background signal 18 may occasionally exceed the background noise level 21. The handling of this situation and the positioning of the background noise level 21 may vary depending pn the specifics of a given application.

FIG. 2 illustrates example graphs associated with a dToF sensor with a cover but no target in the FOV of the dToF sensor, the graphs qualitatively showing a dToF pulse, received crosstalk signal (and background signal), and a corresponding histogram in accordance with embodiments of the invention. Similarly labeled elements may be as previously described.

Referring to FIG. 2, qualitative graphs 200 demonstrate the signal received by the receiver 15 of the dToF sensor 10 when a cover 19 is included. The cover 19 may be referred to as a cover glass (even though it need not be made of glass). The cover 19 may be included for protect the dToF sensor 10 or for aesthetic purposes. The cover 19 may be chosen to be as transparent to the dToF pulse 22 as possible. For a photonic pulse, this may mean transparent to a specific wavelength or range of wavelength of light. In various embodiments, the cover 19 comprises a glass material, and the cover 19 comprises borosilicate glass in one embodiment. In other embodiments, the cover 19 comprises an acrylic material. In one embodiment, the cover 19 comprises polymethyl methacrylate (PMMA). In one embodiment, the cover comprises polycarbonate (PC).

When the emitter 13 emits the dToF pulse 22, the cover 19 transmits some (ideally the majority) of the dToF pulse 22, but a portion of the dToF pulse 22 is reflected back and received as a crosstalk signal 26 at the receiver 15. This signal is stored in the frame 14 of the histogram 12 and may exceed the background noise level 21 (as shown). Although the extent of the received crosstalk signal 26 may not exactly match the extent of the dToF pulse 22 (as shown), the crosstalk signal 26 may be localized to an early portion of the frame 14. For example, a subset of bins 17 may include crosstalk contributions that are above the background noise level 21. In some cases, some or all of the crosstalk calibration processing may use only this subset of bins 17 as opposed to the entire frame 14.

Because the background noise level 21 is exceeded by the crosstalk signal 26, the dToF sensor 10 may incorrectly interpret the crosstalk signal 26 as a target signal. Consequently, it is desirable to compensate for the crosstalk signal 26 (e.g., perform a crosstalk calibration procedure that defines the crosstalk contribution for the specific dToF sensor 10 and stores the correction to reduce or eliminate sensor error due to the crosstalk signal 26).

The specific details of the crosstalk signal 26 depend on the properties of the cover 19 and its placement relative to the emitter 13 and receiver 15. The crosstalk signal 26 may be highly sensitive to various properties of the cover 19, such as the thickness, smoothness, material consistency, distance from the emitter 13 and/or the receiver 15, the lateral extent of the cover 19, how parallel the cover 19 is with respect to the substrate 11 (e.g., with the focal plane), and many other factors. While appropriate values of these parameters may be chosen, the crosstalk signal 26 is highly sensitive to manufacturing variations, and therefore individualized crosstalk calibration (calibration based on the specifics of each dToF sensor 10) should be made to ensure that the dToF sensor 10 is accurate. Further, the cover 19 may be part of a device into which the dToF sensor 10 is integrated. In this case, the manufacture of the dToF sensor 10 may not have control over the details of the cover 19. For these reasons, generalized crosstalk calibration may be infeasible.

FIGS. 3-5 are used to describe three cases involving the presence and location of a target in the FOV of a dToF sensor during a crosstalk calibration process. FIG. 3 illustrates example graphs associated with a dToF sensor emitting N dToF pulses and receiving N crosstalk signals in a first case where there is no target in the FOV of the dToF sensor in accordance with embodiments of the invention. FIG. 4 illustrates example graphs associated with a dToF sensor emitting N dToF pulses and receiving N crosstalk signals in a second case where there is a target in the FOV of the dToF sensor but the target is not in wraparound range of the dToF sensor in accordance with embodiments of the invention. FIG. 5 illustrates example graphs associated with a dToF sensor emitting N dToF pulses and receiving N crosstalk signals in a third case where there is a target the FOV of the dToF sensor in wraparound range of the dToF sensor in accordance with embodiments of the invention. Similarly labeled elements may be as previously described.

Referring to FIG. 3, qualitative graphs 300 show N dToF pulses 20 emitted by an emitter of a dToF sensor and N crosstalk signals 24 corresponding to the N dToF pulses 20 that are received by a receiver of the dToF sensor. Each crosstalk signal 26 of the N crosstalk signals 24 is stored in the histogram 12. Since N is greater than one, the N crosstalk signals 24 include a first crosstalk signal 25 and N−1 remaining crosstalk signals 327. Since there is no target in the FOV, the first crosstalk signal 25 and the N−1 remaining crosstalk signals 327 are similar and represent only the crosstalk contribution. It should be mentioned that a background signal (such as previously discussed) may also be present, but has been omitted from the graphs 300 for clarity. For example, the signals shown may represent the signals as they might be if the background noise is subtracted/filtered out (which of course may be part of the process).

Referring now to FIG. 4, qualitative graphs 400 show N dToF pulses 20 emitted by the dToF sensor and N crosstalk signals 24 corresponding to the N dToF pulses 20 that are received by the dToF sensor. Similar to the first case, the N crosstalk signals 24 include a first crosstalk signal 25 and N−1 remaining crosstalk signals 427. However, in the second case there is a target in the FOV, so a target signal 23 is also present between the crosstalk signals 26. So, although the first crosstalk signal 25 and the N−1 remaining crosstalk signals 427 still only represent the crosstalk contribution, a signal unrelated to the crosstalk contribution (the target signal 23) is also present in each of pulse period 32. For brevity and clarity, a convention has been adopted wherein elements adhering to the pattern [x27] where 'x' is the figure number may be related implementations of remaining crosstalk signals in various embodiments. For example, the N−1 remaining crosstalk signals 427 may be similar to the N−1 remaining crosstalk signals 327 except as otherwise stated (e.g., because of the different environment). An analogous convention may have also been adopted for other elements as made clear by the use of similar terms in conjunction with the aforementioned numbering system.

Turning to the third case, referring to FIG. 5, qualitative graphs 500 show N dToF pulses 20 emitted by the dToF sensor and N crosstalk signals 24 corresponding to the N dToF pulses 20 that are received by the dToF sensor. As before, the N crosstalk signals 24 include a first crosstalk signal 25 and N−1 remaining crosstalk signals 527. But, in the third case the target in the FOV is at a distance that causes the target signal to overlap with the next crosstalk signal 26. That is, a wraparound signal 50 is added to the N−1 remaining crosstalk signals 527. In the wraparound case, the first crosstalk signal 25 includes only the crosstalk contribution while the N−1 remaining crosstalk signals 527 include both the crosstalk contribution and the wraparound signal 50 (not related to the crosstalk contribution). Because the presence of a target is unknown, the wraparound signal 50 is not distinguishable from the crosstalk signal 26 and the estimated crosstalk contribution would be too high if the first crosstalk signal 25 and the N−1 remaining crosstalk signals 527 were simply averaged together.

In all cases, the first step of the crosstalk calibration process is to acquire the N crosstalk signals 24. Specifically, receiving the N crosstalk signals 24 may include storing each of the N crosstalk signals 24 as the histogram 12 in a plurality of bins. Each crosstalk signal may occupy only a portion of the early bins of each frame, such as three to five of the first ten bins of each frame. This is because the time period where a crosstalk contribution is experienced is related to the timing of each dToF pulse 22. Knowing this may allow only a subset of bins 17 may be used in the crosstalk calibration, if desired.

The number N of dToF pulses 22 may be referred to as the sample size and may depend on various factors such as the desired (or required) calibration accuracy and calibration efficiency. For example, the N dToF pulses 20 are emitted over a time period 30 that is equal to about N−1 times the pulse period 32. It may be desirable for N to be sufficiently high so as to achieve a certain sample size to increase statistical accuracy of the crosstalk calibration process. However, larger values of N may be impractical for various reasons such as efficiency of the calibration process, or the environment changing during the calibration process (e.g., at higher N, the time period 30 is longer and may be so long that the assumption that noise and unknown targets in the FOV of the dToF sensor are constant becomes less and less likely).

In various embodiments, N is on the order of hundreds. For example, N is greater than about 100 in some embodiments. If the pulse period 32 is made shorter, then the distance at which the wraparound signal 50 is generated is shorter and the risk of the generating the wraparound signal 50 becomes more likely (e.g., while performing the crosstalk calibration in a production environment). However, as will be discussed in more detail in the following, the wraparound signal 50 may corrected for, advantageously allowing the pulse period 32 to be decreased. As a result, the sample size N may be made higher, such as greater than about 250, or more.

The wraparound distance depends on the pulse period 32 (e.g., the laser period). The pulse period 32 may be on the order of tens of nanoseconds. For example, the pulse period 32 may be less than about 50 ns, such as about 36 ns (corresponding to a wraparound distance of about 10.8 m). However, in various embodiments, the pulse period 32 is reduced, such as to less than about 20 ns (a wraparound distance of about 6 m). In one embodiment, the target signal 23 is about 16 ns (a wraparound distance of about 4.8 m), and it can be made shorter, such as 12 ns, 8 ns, etc.

Each of the dToF pulses 22 has a pulse width 34 which may be much shorter than the pulse period 32 (e.g., in order to be able to resolve targets in the FOV). For example, the pulse width 34 may be less than about 5 ns, such as about 2 ns. Of course, the pulse width 34 may be much shorter, such as in the sub-nanosecond range. Both the pulse width 34 and the pulse period 32 may be kept constant while obtaining the N crosstalk signals 24. Maintaining a constant pulse period 32 may advantageously simplify the crosstalk calibration process compared to alternative techniques.

Even when the sample size N is relatively high, the pulse period 32 may be reduced such that the N dToF pulses 20 are emitted within a sufficiently short time period 30. In some embodiments, the time period 30 is less than about 5 us. The time period 30 may also be shorter, such as less than about 2 us and is about 1.6 us in one embodiment (e.g., N is 100 and pulse period 32 is about 16 ns).

Figure 6:
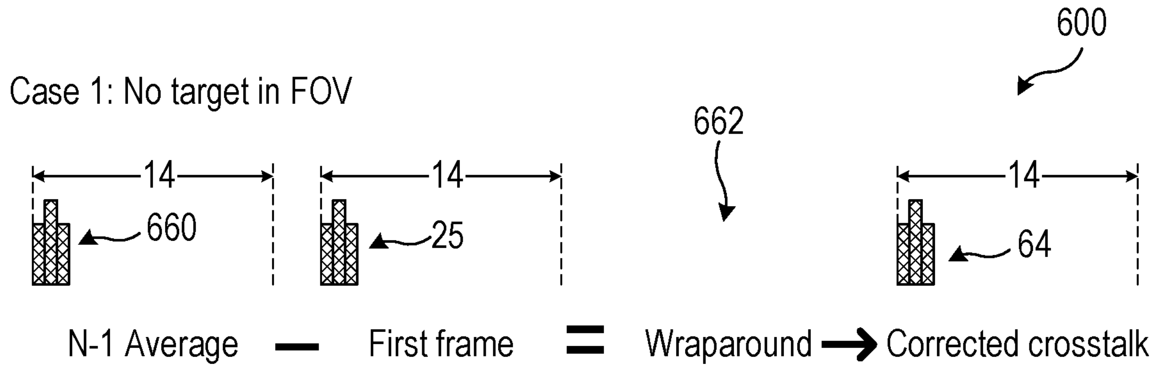
FIG. 6 illustrates an example graph showing histogram frames of the averaged crosstalk signal, the estimated wraparound signal, and the corrected crosstalk signal associated with a dToF sensor in the first case where there is no target in the FOV of the dToF sensor in accordance with embodiments of the invention.
Figure 7:
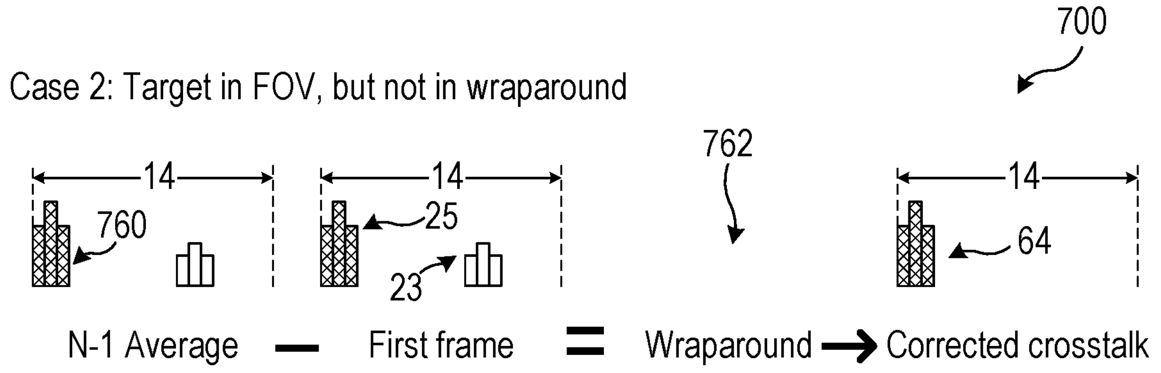
FIG. 7 illustrates another example graph showing histogram frames of the averaged crosstalk signal, the estimated wraparound signal, and the corrected crosstalk signal associated with a dToF sensor in the second case where there is a target in the FOV of the dToF sensor but the target is not in wraparound range of the dToF sensor in accordance with embodiments of the invention.
Figure 8:
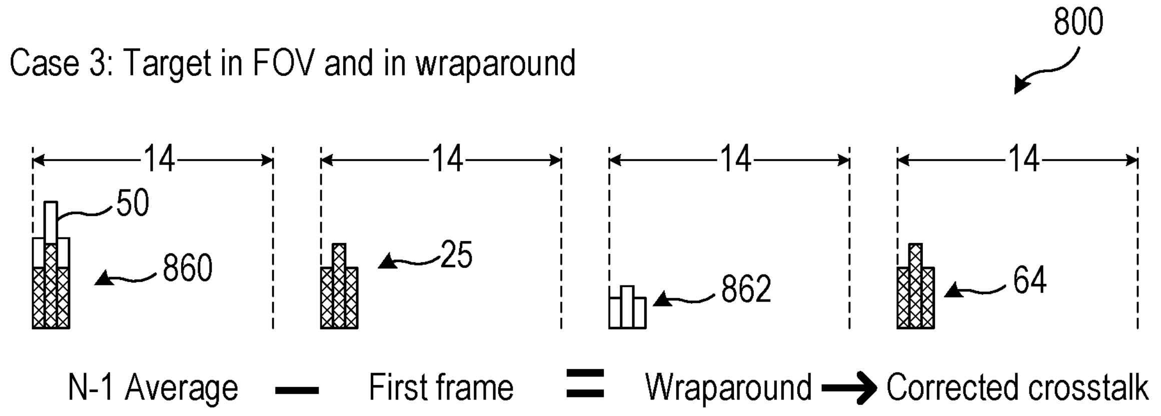
FIG. 8 illustrates still another example graph showing histogram frames of the averaged crosstalk signal, the estimated wraparound signal, and the corrected crosstalk signal associated with a dToF sensor in the third case where there is a target the FOV of the dToF sensor in wraparound range of the dToF sensor in accordance with embodiments of the invention.

FIGS. 6-8 are used to describe techniques to obtain the correct crosstalk contribution for the three cases of FIGS. 3-5. Conventional methods are prone to uncontrollable calibration error when performed in areas with the possibility of unknown targets in the FOV of the dToF sensor. As will be described in the following, the systems and methods of crosstalk calibration described herein can reduce or eliminate this error.

FIG. 6 illustrates an example graph showing histogram frames of the averaged crosstalk signal, the estimated wraparound signal, and the corrected crosstalk signal associated with a dToF sensor in the first case where there is no target in the FOV of the dToF sensor in accordance with embodiments of the invention. FIG. 7 illustrates another example graph showing histogram frames of the averaged crosstalk signal, the estimated wraparound signal, and the corrected crosstalk signal associated with a dToF sensor in the second case where there is a target in the FOV of the dToF sensor but the target is not in wraparound range of the dToF sensor in accordance with embodiments of the invention. FIG. 8 illustrates still another example graph showing histogram frames of the averaged crosstalk signal, the estimated wraparound signal, and the corrected crosstalk signal associated with a dToF sensor in the third case where there is a target the FOV of the dToF sensor in wraparound range of the dToF sensor in accordance with embodiments of the invention. Similarly labeled elements may be as previously described.

Referring to FIG. 6, a qualitative graph 600 shows steps to obtain a corrected crosstalk signal for the first case where there is no target in the FOV of the dToF sensor. The first frame that includes the first crosstalk signal 25 cannot have a wraparound signal because no previous pulses have been emitted. Utilizing this information, the N−1 remaining crosstalk signals are averaged together to generate an averaged crosstalk signal 660. The first crosstalk signal 25 is then subtracted from the averaged crosstalk signal 660 to obtain an estimated wraparound signal 662 (here it is negligible, shown as nothing, because there is no target in the wraparound range).

The estimated wraparound signal 662 is then subtracted from each of the N−1 remaining crosstalk signals to obtain corrected crosstalk signals 64. Because the first crosstalk signal 25 has no wraparound contribution, the result is N accurate crosstalk signals that can be used to calibrate the dToF sensor to compensate for crosstalk.

For the second case, referring to FIG. 7, a qualitative graph 700 shows the results when the same steps are applied in the second case where there is a target in the FOV of the dToF sensor. The N−1 remaining crosstalk signals are averaged together to generate an averaged crosstalk signal 760. The first crosstalk signal 25 is then subtracted from the averaged crosstalk signal 760 to obtain an estimated wraparound signal 762 (again it is negligible, shown as nothing, because there is the target is in the FOV but not in the wraparound range). Subtraction of the estimated wraparound signal 762 still results in the corrected crosstalk signals 64.

Now referring to FIG. 8, a qualitative graph 800 shows the results when the same steps are applied in the third case (wraparound case) where a target in the FOV of the dToF sensor is in the wraparound range. The N−1 remaining crosstalk signals are averaged together to generate an averaged crosstalk signal 860. In contrast to the first and second cases, the averaged crosstalk signal 860 has a wraparound signal 50 that needs to be removed. The first crosstalk signal 25 is subtracted from the averaged crosstalk signal 860 to obtain an estimated wraparound signal 862. Now, the first crosstalk signal 25 has been used as a baseline and does not include the wraparound signal 50. So, the estimated wraparound signal 862 is now the average of all the wraparound signals 50 in the N−1 remaining crosstalk signals. Subtraction of the estimated wraparound signal 862 removes the wraparound signal 50 from each (i.e. corrects the crosstalk contribution estimate) and again results in the corrected crosstalk signals 64.

As demonstrated above, the crosstalk calibration process produces the desired corrected crosstalk signals 64 in all possible cases involving unknown targets in the FOV of the dToF sensor (e.g., while in a production environment, such as on a production line. Therefore, whatever the conditions, the crosstalk calibration can advantageously be run even with an unknown setup. Optionally, averaging the N−1 remaining crosstalk signals, subtracting the first crosstalk signal, and subtracting the estimated wraparound signal may use only a subset of the plurality of bins of each histogram with each subset containing a corresponding one of the N crosstalk signals. As already discussed, the above described method may also involve processing to remove or correct for background noise, such as subtracting out (e.g. filtering out) a background signal.

The crosstalk calibration steps described herein may be implemented as a computer program stored in a dToF sensing device into which a dTof sensor has been embedded. For example, the computer program is firmware stored in integrated memory of a microcontroller of the dToF sensor in one embodiment. In another embodiment, the computer program is software stored in device memory of the a dToF sensing device (e.g., range finder, ToF camera, smart phone, automotive collision detection module or 3D imaging system, etc.). The computer program implementing the above steps may be used before a typical crosstalk calibration process to ensure that the sample of the crosstalk signals are corrected (e.g. free from wraparound corruption).

Figure 9:
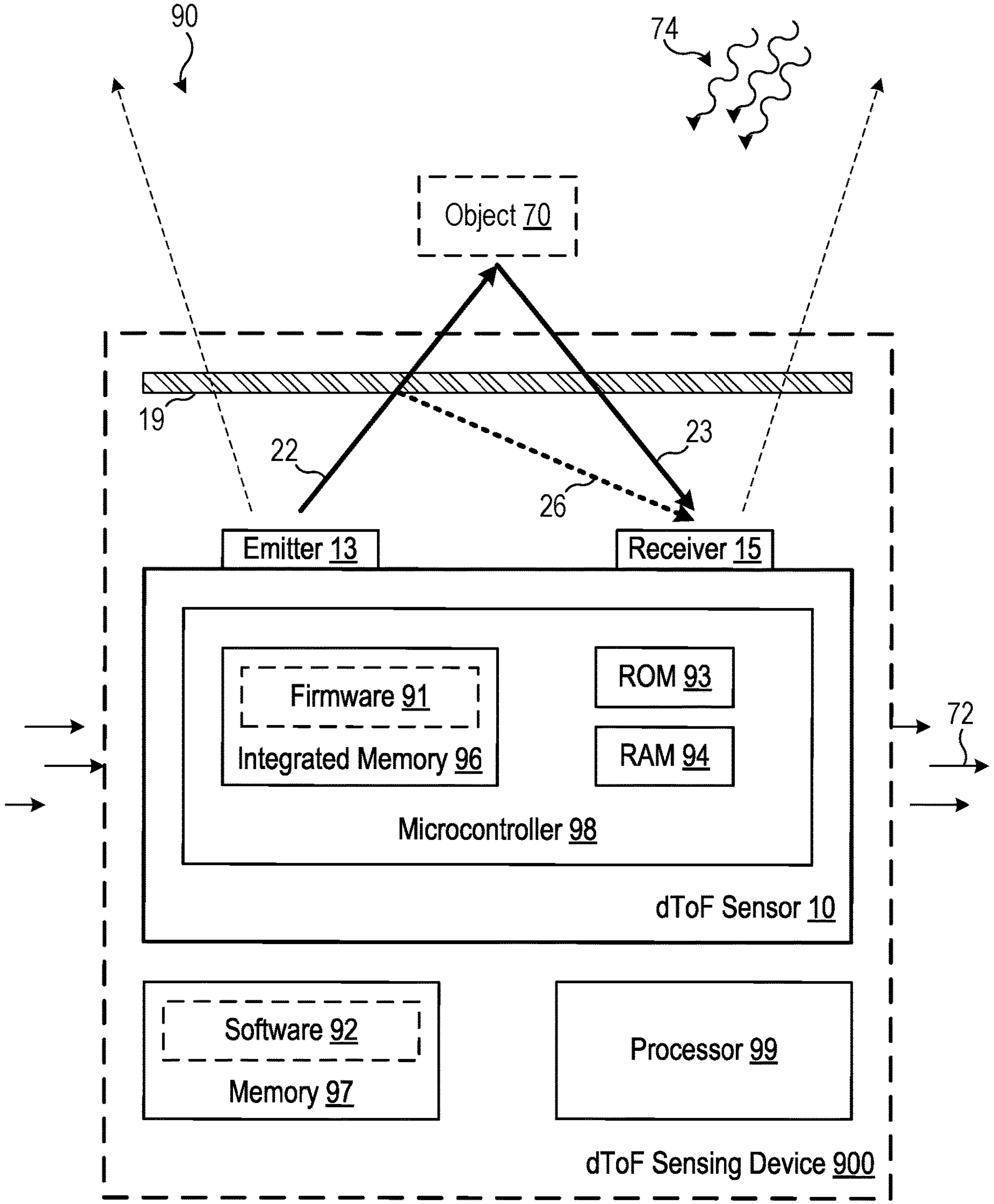
FIG. 9 illustrates an example dToF sensing device that includes a dToF sensor and a cover in accordance with embodiments of the invention.

FIG. 9 illustrates an example dToF sensing device that includes a dToF sensor and a cover in accordance with embodiments of the invention. Any of the methods for calibrating a dToF sensor to compensate for crosstalk may be performed by the dToF sensing device of FIG. 9, such as the methods described in FIGS. 1-8 and 11, for example. Similarly labeled elements may be as previously described.

Referring to FIG. 9, a dToF sensing device 900 includes a dToF sensor 10. The dToF sensor 10 may be a module that can be embedded into a system, such as the dToF sensing device 900. For example, the dToF sensing device 900 may be a range finder, ToF camera, smart phone, automotive collision detection module or 3D imaging system, and others. The dToF sensor 10 may include a microcontroller 98 that has its own ROM 93 (read-only memory), RAM 94 (random access memory), and integrated memory 96. For example, program instructions that, when executed, enable the microcontroller 98 to perform the crosstalk calibration methods described herein may be stored as firmware 91 in the integrated memory 96 of the microcontroller 98 of the dToF sensor.

The dToF sensing device 900 may also include its own memory 97 and processor 99. The dToF sensor 10 may be embedded in the dToF sensing device 900 and some or all of the program instructions may be stored as software 92 in the memory 97 of the dToF sensing device 900. The program instructions may then enable the processor 99 to perform the method when executed by the processor 99 (e.g., directly or by causing the microcontroller 98 to perform the steps). Of course, other configurations are possible and may be apparent to those of skill in the art.

As shown, the emitter 13 of the dToF sensor 10 emits a dToF pulse 22 that passes through a cover 19 that may be reflected off of an object 70 in the FOV 90 of the dToF sensor 10. The resulting target signal 23 also passes through the cover 19 and is received by the receiver 15. A crosstalk signal 26 is generated when the dToF pulse 22 is reflected (e.g., does not pass through) the cover 19. The receiver 15 also receives the crosstalk signal 26 (the signals do not arrive at the same time due to the distance difference, but are both shown for clarity).

As previously mentioned, the crosstalk calibration methods described herein may advantageously be performed even when an object 70 is in the FOV 90 of the dToF sensor 10, when the dToF sensing device 900 is moving 72, and/or in the presence of ambient light 74.

Figure 10:
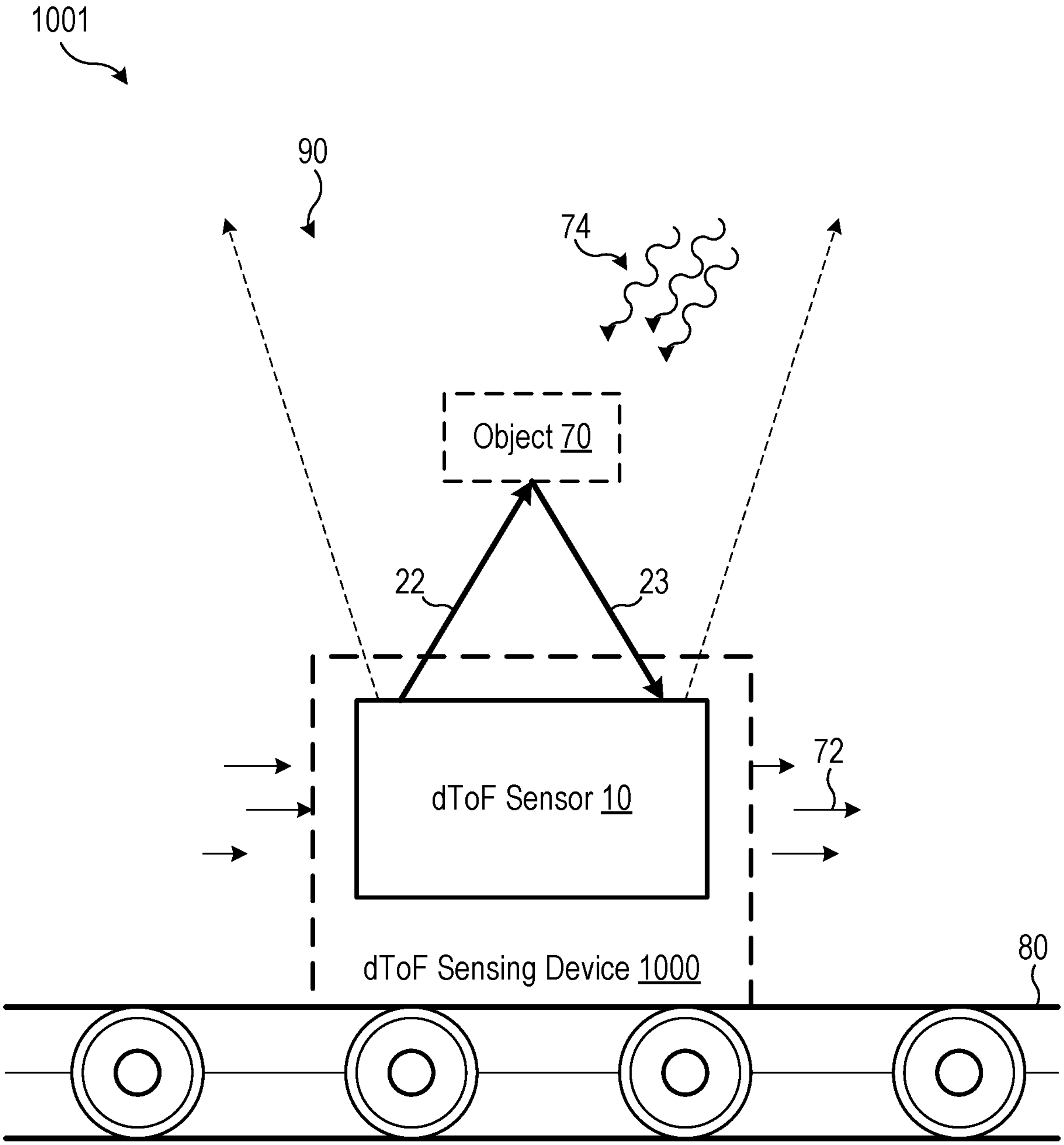
FIG. 10 illustrates another example dToF device that includes a dToF sensor and a cover where the dToF device is on a production line in accordance with embodiments of the invention.

FIG. 10 illustrates another example dToF device that includes a dToF sensor and a cover where the dToF device is on a production line in accordance with embodiments of the invention. Any of the methods for calibrating a dToF sensor to compensate for crosstalk may be performed by the dToF sensing device of FIG. 10, such as the methods described in FIGS. 1-8 and 11, for example. Similarly labeled elements may be as previously described.

Referring to FIG. 10, a production environment 1001 is conceptually shown that may include an object 70 and/or ambient light 74. A dToF sensing device 1000 is shown moving 72 on a production line 80. The dToF sensing device 1000 may advantageously be calibrated while on the production line 80. That is, the crosstalk calibration methods described herein may be performed while the dToF sensor 10 in the dToF sensing device 1000 is moving 72 on the production line 80.

Figure 11:
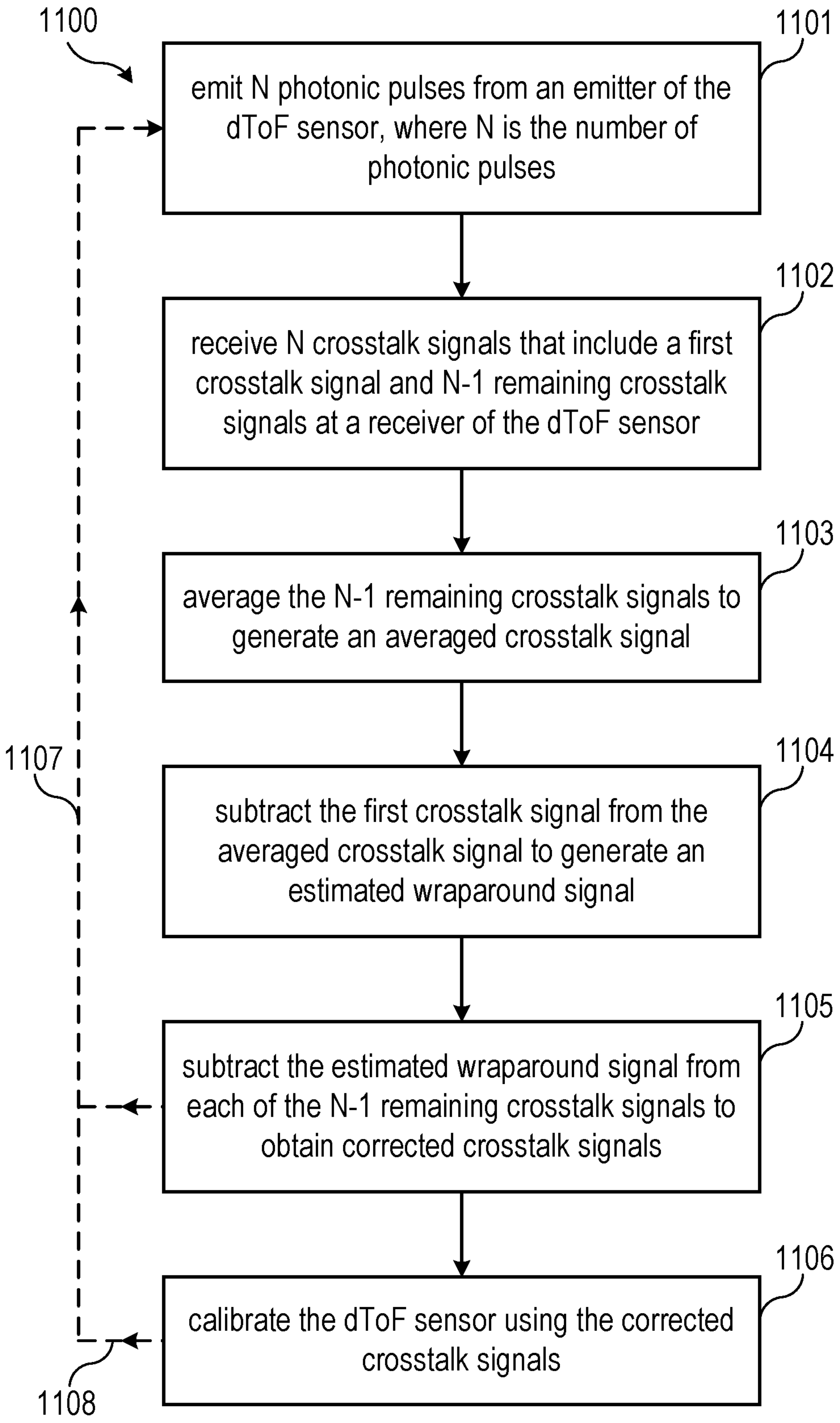
FIG. 11 illustrates a method of calibrating a dToF sensor to compensate for crosstalk in accordance with embodiments of the invention.

The method of FIG. 11 may be combined with other methods and performed using the systems and apparatuses as described herein. For example, the method of FIG. 11 may be combined with any of the embodiments of FIGS. 1-10. Although shown in a logical order, the arrangement and numbering of the steps of FIG. 11 are not intended to be limited. The method steps of FIG. 11 may be performed in any suitable order or concurrently with one another as may be apparent to a person of skill in the art.

Referring to FIG. 11, a method 1100 for calibrating a dToF sensor to compensate for crosstalk includes a step 1101 of emitting N photonic pulses from an emitter of the dToF sensor and a step 1102 of receiving N crosstalk signals at a receiver of the dToF sensor where N is the number of photonic pulses. The N crosstalk signals include a first crosstalk signal and N−1 remaining crosstalk signals.

The N−1 remaining crosstalk signals are averaged in step 1103 to generate an averaged crosstalk signal. In step 1104, the first crosstalk signal is subtracted from the averaged crosstalk signal to generate an estimated wraparound signal. Step 1105 includes subtracting the estimated wraparound signal from each of the N−1 remaining crosstalk signals to obtain corrected crosstalk signals. The dToF sensor is the calibrated using the corrected crosstalk signals in step 1106.

Optionally, one or more of the steps may be repeated in step 1107 (repeating the wraparound correction). For example, emitting the N photonic pulses (1101), receiving the N crosstalk signals (1102), averaging the N−1 remaining crosstalk signals (1103), subtracting the first crosstalk signal (1104), and subtracting the estimated wraparound signal (1105) may be performed multiple times while the dToF sensor is on a production line to generate multiple corrected crosstalk signals. Calibrating the dToF sensor may then use the multiple corrected crosstalk signals. Alternatively, the entire calibration may also be repeated (step 1108) and the results averaged.

Example embodiments of the invention are summarized here. Other embodiments can also be understood from the entirety of the specification as well as the claims filed herein.

Example 1. A method of calibrating a direct time-of-flight (dToF) sensor to compensate for crosstalk, the method including: emitting N photonic pulses from an emitter of the dToF sensor, N being the number of photonic pulses; receiving N crosstalk signals including a first crosstalk signal and N−1 remaining crosstalk signals at a receiver of the dToF sensor; averaging the N−1 remaining crosstalk signals to generate an averaged crosstalk signal; subtracting the first crosstalk signal from the averaged crosstalk signal to generate an estimated wraparound signal; subtracting the estimated wraparound signal from each of the N−1 remaining crosstalk signals to obtain corrected crosstalk signals; and calibrating the dToF sensor using the corrected crosstalk signals.

Example 2. The method of example 1, where emitting the N photonic pulses and receiving the N crosstalk signals is performed in a time period less than about 5 us.

Example 3. The method of example 2, where N is greater than about 100.

Example 4. The method of one of examples 1 to 3, where emitting the N photonic pulses includes emitting the N photonic pulses with a constant pulse period, the constant pulse period being the time period between successive photonic pulses.

Example 5. The method of example 4, where the constant pulse period is less than about 50 ns.

Example 6. The method of example 5, where the constant pulse period is about 16 ns.

Example 7. The method of one of examples 1 to 6, where each of the N photonic pulses includes a pulse width less than about 5 ns.

Example 8. The method of example 7, where the pulse width is about 2 ns.

Example 9. The method of one of examples 1 to 8, where the method is performed while the dToF sensor is moving on a production line.

Example 10. The method of one of examples 1 to 9, where the method is performed while an object is in a field of view of the dToF sensor, the object generating a wraparound signal.

Example 11. The method of one of examples 1 to 10, where emitting the N photonic pulses, receiving the N crosstalk signals, averaging the N−1 remaining crosstalk signals, subtracting the first crosstalk signal, and subtracting the estimated wraparound signal is performed multiple times while the dToF sensor is on a production line to generate multiple corrected crosstalk signals, and where calibrating the dToF sensor includes using the multiple corrected crosstalk signals.

Example 12. The method of one of examples 1 to 11, where receiving the N crosstalk signals includes storing each of the N crosstalk signals as a histogram including a plurality of bins, and where averaging the N−1 remaining crosstalk signals, subtracting the first crosstalk signal, and subtracting the estimated wraparound signal use only a subset of the plurality of bins of each histogram, each subset containing a corresponding one of the N crosstalk signals.

Example 13. The method of one of examples 1 to 12, further including: subtracting out a background signal before calibrating the dToF sensor.

Example 14. The method of one of examples 1 to 13, where the method is performed in the presence of ambient light.

Example 15. The method of one of examples 1 to 14, where program instructions are stored as firmware in integrated memory of a microcontroller of the dToF sensor, the program instructions enabling the microcontroller to perform the method when executed by the microcontroller.

Example 16. The method of one of examples 1 to 15, where the dToF sensor is embedded in a device including memory and a processor, and where program instructions are stored as software in the memory of the device, the program instructions enabling the processor to perform the method when executed by the processor.

Example 17. A direct time-of-flight (dToF) sensing device including: a dToF sensor including an emitter configured to emit N photonic pulses, and a receiver configured to receive N crosstalk signals including a first crosstalk signal and N−1 remaining crosstalk signals, N being the number of photonic pulses; a processor coupled to the dToF sensor; and a memory storing program instructions coupled to the processor, the program instructions, when executed by the processor, enabling the processor to average the N−1 remaining crosstalk signals to generate an averaged crosstalk signal, subtract the first crosstalk signal from the averaged crosstalk signal to generate an estimated wraparound signal, subtract the estimated wraparound signal from each of the N−1 remaining crosstalk signals to obtain corrected crosstalk signals, and calibrate the dToF sensor using the corrected crosstalk signals.

Example 18. The dToF sensing device of example 17, where the processor is a microprocessor of the dToF sensing device, where the memory is an integrated memory of the microprocessor, and where the program instructions are stored as firmware in the integrated memory.

Example 19. The dToF sensing device of one of examples 17 and 18, where the dToF sensor is embedded in the dToF sensing device, where the memory is device memory separate from the dToF sensor, and where the program instructions are stored as software in the device memory.

Example 20. The dToF sensing device of one of examples 17 to 19, where the program instructions further enable the processor to cause the dToF sensor to emit the N photonic pulses and receive the N crosstalk signals in a time period less than about 5 us.

Example 21. The dToF sensing device of example 20, where N is greater than about 100.

Example 22. The dToF sensing device of one of examples 17 to 21, where the program instructions further enable the processor to cause the dToF sensor to emit the N photonic pulses with a constant pulse period, the constant pulse period being the time period between successive photonic pulses.

Example 23. The dToF sensing device of one of examples 17 to 22, where the program instructions further enable the processor to cause the dToF sensor to emit the N photonic pulses, receive the N crosstalk signals, average the N−1 remaining crosstalk signals, subtract the first crosstalk signal, and subtract the estimated wraparound signal multiple times while the dToF sensing device is on a production line to generate multiple corrected crosstalk signals, and where calibrating the dToF sensor includes using the multiple corrected crosstalk signals.

Example 24. A direct time-of-flight (dToF) sensing device, including: a dToF sensor including a focal plane and a field of view disposed over the focal plane; a cover glass disposed over the focal plane; an emitter disposed at the focal plane and configured to emit N photonic pulses towards the cover glass to generate N crosstalk signals from portions of each of the N photonic pulses that are reflected by the cover glass, the N crosstalk signals including a first crosstalk signal and N−1 remaining crosstalk signals, N being the number of photonic pulses; a receiver disposed at the focal plane and configured to receive the N crosstalk signals; a processor coupled to the dToF sensor, the processor being configured to average the N−1 remaining crosstalk signals to generate an averaged crosstalk signal, subtract the first crosstalk signal from the averaged crosstalk signal to generate an estimated wraparound signal. subtract the estimated wraparound signal from each of the N−1 remaining crosstalk signals to obtain corrected crosstalk signals, and calibrate the dToF sensor using the corrected crosstalk signals.

Example 25. The dToF sensing device of example 24, where the emitter is configured to emit the N photonic pulses while the dToF sensing device is moving on a production line.

Example 26. The dToF sensing device of one of examples 24 and 25, where the emitter is configured to emit the N photonic pulses while an object is in the field of view of the dToF sensor, the object generating a wraparound signal.

Example 27. The dToF sensing device of one of examples 24 to 26, where the emitter is configured to emit the N photonic pulses in the presence of ambient light.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of calibrating a direct time-of-flight (dToF) sensor to compensate for crosstalk, the method comprising:
- emitting N photonic pulses from an emitter of the dToF sensor, N being the number of photonic pulses;
- receiving N crosstalk signals comprising a first crosstalk signal and N−1 remaining crosstalk signals at a receiver of the dToF sensor, each of the N crosstalk signals comprising a portion of a respective one of the N photonic pulses reflected back to the receiver;
- averaging the N−1 remaining crosstalk signals to generate an averaged crosstalk signal;
- subtracting the first crosstalk signal from the averaged crosstalk signal to generate an estimated wraparound signal;

subtracting the estimated wraparound signal from each of the N−1 remaining crosstalk signals to obtain corrected crosstalk signals; and calibrating the dToF sensor using the corrected crosstalk signals.

2. The method of claim 1, wherein emitting the N photonic pulses and receiving the N crosstalk signals is performed in a time period less than about 5 μs.

3. The method of claim 2, wherein N is greater than about 100.

4. The method of claim 1, wherein emitting the N photonic pulses comprises emitting the N photonic pulses with a constant pulse period, the constant pulse period being the time period between successive photonic pulses.

5. The method of claim 1, wherein the method is performed while the dToF sensor is moving on a production line.

6. The method of claim 1, wherein the method is performed while an object is in a field of view of the dToF sensor, the object generating a wraparound signal.

7. The method of claim 1, wherein emitting the N photonic pulses, receiving the N crosstalk signals, averaging the N−1 remaining crosstalk signals, subtracting the first crosstalk signal, and subtracting the estimated wraparound signal are performed multiple times while the dToF sensor is on a production line to generate multiple corrected crosstalk signals, and wherein calibrating the dToF sensor comprises using the multiple corrected crosstalk signals.

8. The method of claim 1, wherein receiving the N crosstalk signals comprises storing each of the N crosstalk signals as a histogram comprising a plurality of bins, and wherein averaging the N−1 remaining crosstalk signals, subtracting the first crosstalk signal, and subtracting the estimated wraparound signal use only a subset of the plurality of bins of each histogram, each subset containing a corresponding one of the N crosstalk signals.

9. The method of claim 1, wherein the method is performed in the presence of ambient light.

10. A direct time-of-flight (dToF) sensing device comprising:

a dToF sensor comprising an emitter configured to emit N photonic pulses, and a receiver configured to receive N crosstalk signals comprising a first crosstalk signal and N−1 remaining crosstalk signals, N being the number of photonic pulses, each of the N crosstalk signals comprising a portion of a respective one of the N photonic pulses reflected back to the receiver;

a processor coupled to the dToF sensor; and a memory storing program instructions coupled to the processor, the program instructions, when executed by the processor, enabling the processor to average the N−1 remaining crosstalk signals to generate an averaged crosstalk signal, subtract the first crosstalk signal from the averaged crosstalk signal to generate an estimated wraparound signal, subtract the estimated wraparound signal from each of the N−1 remaining crosstalk signals to obtain corrected crosstalk signals, and calibrate the dToF sensor using the corrected crosstalk signals.

11. The dToF sensing device of claim 10, wherein the processor is a microprocessor of the dToF sensing device, wherein the memory is an integrated memory of the microprocessor, and wherein the program instructions are stored as firmware in the integrated memory.

12. The dToF sensing device of claim 10, wherein the dToF sensor is embedded in the dToF sensing device, wherein the memory is device memory separate from the dToF sensor, and wherein the program instructions are stored as software in the device memory.

13. The dToF sensing device of claim 10, wherein the program instructions further enable the processor to cause the dToF sensor to emit the N photonic pulses and receive the N crosstalk signals in a time period less than about 5 μs.

14. The dToF sensing device of claim 13, wherein N is greater than about 100.

15. The dToF sensing device of claim 10, wherein the program instructions further enable the processor to cause the dToF sensor to emit the N photonic pulses with a constant pulse period, the constant pulse period being the time period between successive photonic pulses.

16. The dToF sensing device of claim 10, wherein the program instructions further enable the processor to cause the dToF sensor to emit the N photonic pulses, receive the N crosstalk signals, average the N−1 remaining crosstalk signals, subtract the first crosstalk signal, and subtract the estimated wraparound signal multiple times while the dToF sensing device is on a production line to generate multiple corrected crosstalk signals, and wherein calibrating the dToF sensor comprises using the multiple corrected crosstalk signals.

17. A direct time-of-flight (dToF) sensing device, comprising:

a dToF sensor comprising a focal plane and a field of view disposed over the focal plane;

a cover glass disposed over the focal plane;

an emitter disposed at the focal plane and configured to emit N photonic pulses towards the cover glass to generate N crosstalk signals from portions of each of the N photonic pulses that are reflected by the cover glass, the N crosstalk signals comprising a first crosstalk signal and N−1 remaining crosstalk signals, N being the number of photonic pulses;

a receiver disposed at the focal plane and configured to receive the N crosstalk signals; and a processor coupled to the dToF sensor, the processor being configured to average the N−1 remaining crosstalk signals to generate an averaged crosstalk signal, subtract the first crosstalk signal from the averaged crosstalk signal to generate an estimated wraparound signal, subtract the estimated wraparound signal from each of the N−1 remaining crosstalk signals to obtain corrected crosstalk signals, and calibrate the dToF sensor using the corrected crosstalk signals.

18. The dToF sensing device of claim 17, wherein the emitter is configured to emit the N photonic pulses while the dToF sensing device is moving on a production line.

19. The dToF sensing device of claim 17, wherein the emitter is configured to emit the N photonic pulses while an object is in the field of view of the dToF sensor, the object generating a wraparound signal.

20. The dToF sensing device of claim 17, wherein the emitter is configured to emit the N photonic pulses in the presence of ambient light.

* * * * *